Oct. 19, 1926.
C. W. HEPPENSTALL
1,603,769
MEANS FOR PREHEATING AIR FOR HEATING FURNACES
Filed Nov. 17, 1924
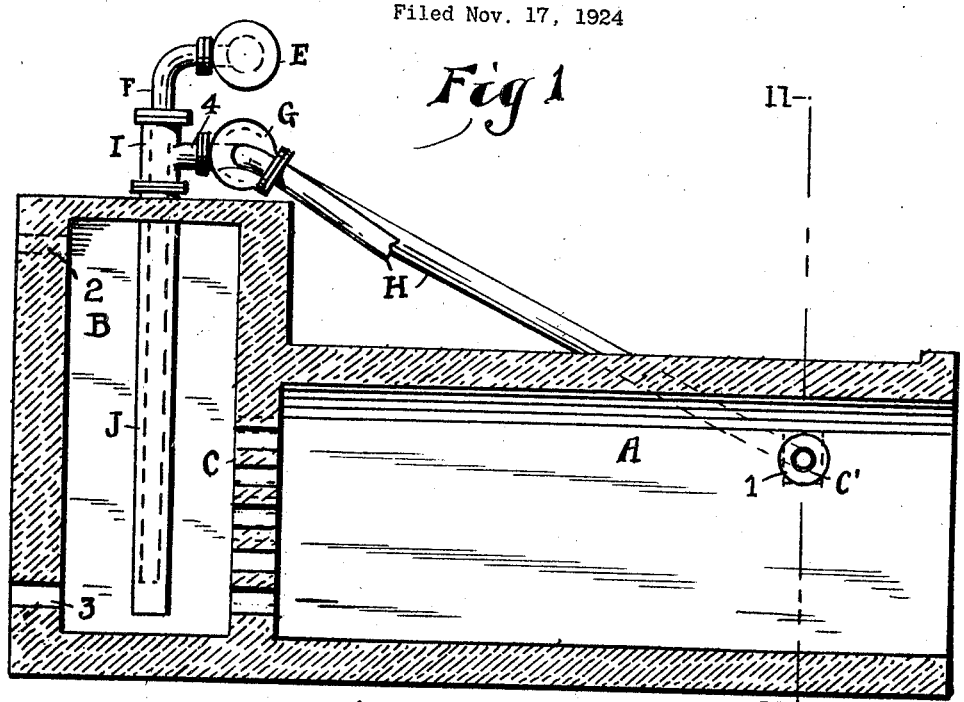
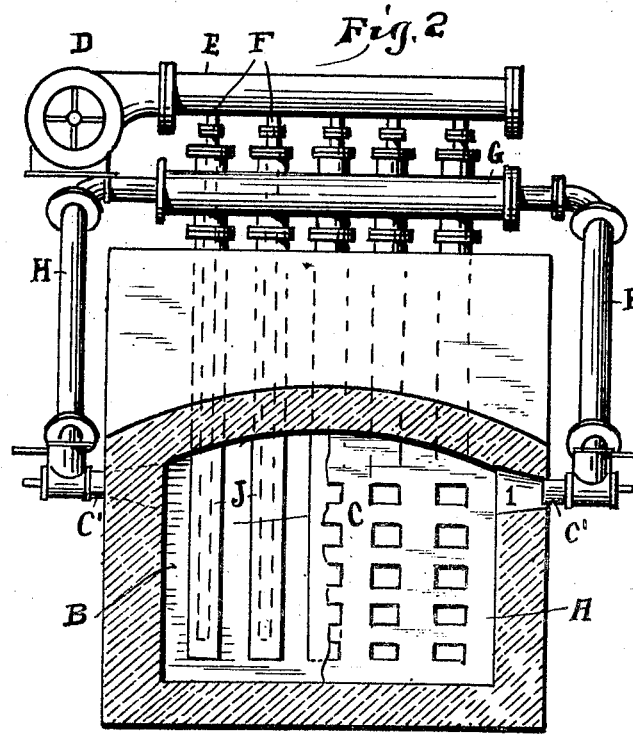
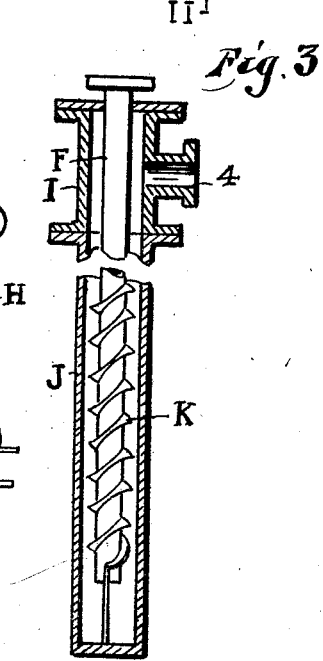
INVENTOR
Charles W. Heppenstall,
by Edward A. Lawrence,
his attorney.

Patented Oct. 19, 1926.

1,603,769

UNITED STATES PATENT OFFICE.

CHARLES W. HEPPENSTALL, OF PITTSBURGH, PENNSYLVANIA, ASSIGNOR TO HEPPENSTALL FORGE AND KNIFE COMPANY, OF PITTSBURGH, PENNSYLVANIA, A CORPORATION OF PENNSYLVANIA.

MEANS FOR PREHEATING AIR FOR HEATING FURNACES.

Application filed November 17, 1924. Serial No. 750,308.

My present invention relates to the type of heating furnace, such as for heating ingots, billets and the like, wherein the air is preheated, before it is supplied to the liquid or gaseous-fuel burners, as by being passed through a waste heat chamber into which the burning gases pass from heating chamber of the furnace. Such a furnace is shown in Letters Patent of the United States No. 1,444,918, granted to me on February 13th, 1923.

The object which I now have in view is an improvement in the preheating of the air in the waste heat chamber, thereby obtaining higher furnace temperatures and a marked economy in fuel.

My present invention therefore includes improvements in means for preheating the air for the burners of furnaces of this general type.

More particularly I preheat the atmospheric air, which is supplied under pressure, by subjecting it to the waste heat of the furnace, preferably by introducing it into chambers, hereinafter referred to as "heating tubes", which preferably extend into the waste heat chamber, preferably vertically, the air being supplied to the inner or lower ends of the heating tubes and being led off from the other or upper ends of the heating tubes. The inner or lower ends of the heating tubes are closed.

For the introduction of the air into the heating tubes I provide inlet pipes which also extend into the furnace and discharge the air under pressure into the inner ends of the heating tubes.

In the preferred embodiment of my invention, I employ inlet pipes of materially smaller diameter than the heating tubes, and project the former into the interior of the latter to within a short distance of the closed ends, the inlet pipes being of sufficiently less diameter than the heating tubes to provide sufficient space around the former for the outward travel of the columns of heated air.

I prefer to provide a plurality of such heating tubes, the same projecting downwardly through the top of the furnace, preferably into a waste heat chamber to within a short distance of the bottom of the latter. The upper ends of said heating tubes are connected to a heated air manifold which is in turn connected to the burners by suitable pipes. In such case an equal number of inlet pipes are provided, also vertically disposed and extending down in the heating tubes, and with their lower ends open for the discharge of the air into the lower ends of the heating tubes. The upper and protruding ends of the inlet pipes are connected to a cold air manifold which is itself connected to a suitable blower or other source of supply of air under proper pressure.

I prefer to provide means for maintaining the traveling columns of air in the heating tube, and surrounding the inlet pipes, in intimate contact with the heated walls of the heating tubes. Thus, I may provide the inlet pipes with helical, external fins or ribs which preferably do not contact with the walls of the heating tubes but serve to force the traveling columns of air outwardly into contact with the walls of the heating tubes.

Other novel features of construction, and also of arangement of parts will appear from the following description.

In the accompanying drawings, which are however merely intended to illustrate the best embodiment of the principles of my invention now known to me but not to limit the scope of the invention to the construction shown, Fig. 1 is a longitudinal, vertical section of a heating furnace to which my invention is applied; Fig. 2 is a cross-sectional view of the same, taken along the line II—II in Fig. 1, the ported wall, which separates the heating chamber from the waste heat chamber, being partially broken away to show the air-preheating mechanism, and Fig. 3 is an enlarged detail in vertical section showing one of the air heating tubes and its associated air inlet pipe.

The following is a detailed description of the drawings.

The heating furnace is comprised of a heating chamber A in which the ingots, billets or the like are heated, and a waste heat chamber B into which the burning gases escape from the chamber A through a port or ports in the dividing wall C. In the drawings, I have illustrated said wall as of checker construction, providing a plurality of spaced ports.

The chamber A is heated by means of burners C' communicating with ports 1 in the side walls of the chamber, and supplied with liquid or gaseous fuel, and also with heated air under pressure to sustain combustion.

The chamber B is preferably vertically disposed and of greater height than the chamber A. At its upper portion it is provided with a restricted or choked outlet 2. 3 is a clean-out opening in the lower portion of the chamber, normally blocked by a suitable door or other closure to prevent escape of the burning gases from the lower portion of the chamber B.

D represents a blower or other source of supply of air under pressure, said blower being connected to a cold air manifold E which is horizontally disposed above the chamber B and transversely of the furnace. F represents a plurality of vertically disposed air inlet pipes having their upper ends connected to the manifold E and depending down through the top of and within the chamber B.

G represents the heated air manifold which is parallel with but preferably below and in front of the manifold E, and whose ends are connected by the pipes H with the fuel burners C. At spaced intervals the manifold G is connected to the horizontally disposed stems 4 of the T-fittings I through which extend the inlet pipes F. The upper ends of said fittings are provided with suitable closures to provide a sufficiently tight joint with the pipes F to prevent an upward escape of air from the fittings. The lower ends of the fittings I have attached thereto the depending heating tubes J whose lower ends extend to within a short distance from the bottom of the chamber B and are closed. The inlet pipes F extend down within the tubes J, to within a short distance of the bottom of the latter, and have their lower ends open for the discharge of the air therefrom into the heating tubes. The external diameter of the inlet pipes is sufficiently less than the internal diameter of the heating pipes to provide an ample annular space for the ascent of the heated air around the inlet pipes to the fittings I and the manifold G.

I provide means for forcing the hollow columns of air, ascending around the inlet pipes, into intimate contact with the superheated walls of the heating tubes. Thus I show helical fins or ribs K mounted on the inlet pipes but preferably out of contact with the walls of the heating tubes, thus forcing the column of ascending air to maintain intimate contact with the walls of the heating tubes without materially interfering with their travel. The ribs K may be cast integral with the inlet pipes. The heating tubes and the inlet pipes are preferably of wrought metal to properly withstand the high temperatures of the waste heat chamber.

In the operation of my invention, the air is supplied under pressure by the blower D, thus maintaining a constant travel of air down the inlet pipes and thence up the heating pipes and thence to the burners. The heat and burning gases flow from the chamber A into the chamber B and are baffled and reverberated therein by the choked escape therefrom, thus thoroughly heating the heating tubes and maintaining them in a highly heated state.

In this type of furnace, no draft is usually employed to sustain combustion, as the heated air is supplied under suitable pressure directly to the burners, and thus the choking of the escape of the products of combustion does not interfere with the proper combustion of the fuel in the heating chamber.

If desired, a single heating tube of sufficiently large capacity, supplied with air by one or more inlet pipes, may be employed, but I prefer to use a plurality of heating tubes, as I am thus enabled to bring the heat of the burning gases into more intimate contact with the air to be preheated.

What I desire to claim is—

1. In combination with a heating furnace wherein combustion is induced by the introduction of burning gas flames through burners under air pressure, the furnace being provided with a waste heat chamber having its lower end connected with the heating chamber and its upper end provided with waste-gas exhaust means, means for preheating the compressed air for said burners consisting of a tube extending downwardly in said preheating chamber and substantially to the bottom thereof, means for supplying air under pressure to the lower and inner end of said tube, and means for carrying off the heated air from the upper and outer end of said tube and conveying it to the burners.

2. In combination with a heating furnace wherein combustion is induced by the introduction of burning gas flames through burners under air pressure, the furnace being provided with a waste heat chamber having its lower end connected with the heating chamber and its upper end provided with waste-gas exhaust means, a hot air manifold, connections between said hot air manifold and the burners, heating tubes connected at their upper ends to said manifold and extending downwardly within said waste heat chamber and substantially to the bottom thereof, the lower ends of said heating tubes being closed, a cold air manifold, means for supplying air under pressure thereto, and air inlet pipes having their upper ends connected to said cold air manifold and extending downwardly within said heating tubes whereby cold air under pressure is discharged into the lower ends of said heating tubes.

Signed at Pittsburgh, Pa., this 12th day of November, 1924.

CHARLES W. HEPPENSTALL.